(12) United States Patent
Jin et al.

(10) Patent No.: US 6,176,331 B1
(45) Date of Patent: Jan. 23, 2001

(54) BEARING SEALING MEANS OF EARTH BORING BITS

(75) Inventors: Zhi Xun Jin; Xian Zhong Qiu; Feng Shou Xia; Ai Jun Li, all of Hubei (CN)

(73) Assignee: Kingdream Public Ltd., Co., Hubei (CN)

(*) Notice: Under 35 U.S.C. 154(b), the term of this patent shall be extended for 0 days.

(21) Appl. No.: 09/201,533

(22) Filed: Nov. 30, 1998

(30) Foreign Application Priority Data

Mar. 25, 1998 (CN) .................................................. 98113483

(51) Int. Cl.$^7$ .................................................... D21B 10/22
(52) U.S. Cl. ............................. 175/372; 175/359; 384/94
(58) Field of Search ................................. 175/371, 359, 175/372; 384/94

(56) References Cited

U.S. PATENT DOCUMENTS

| 4,074,922 | 2/1978 | Murdoch . | |
|---|---|---|---|
| 4,168,868 | 9/1979 | Shields . | |
| 4,256,351 | 3/1981 | Langford, Jr. . | |
| 4,277,109 | 7/1981 | Crow . | |
| 4,394,020 | 7/1983 | Oelke | 277/1 |
| 4,410,284 | 10/1983 | Herrick | 384/93 |
| 4,428,687 | 1/1984 | Zahradnik | 384/94 |
| 4,429,854 | * 2/1984 | Kar et al. | 384/94 |
| 4,466,622 | 8/1984 | Deane et al. | 277/92 |
| 4,516,641 | 5/1985 | Burr | 175/228 |

FOREIGN PATENT DOCUMENTS

| 0 472 809 A1 | 3/1992 | (EP) . |
| 941534 | 7/1982 | (SU) . |
| 1317-090A | 6/1987 | (SU) . |

* cited by examiner

*Primary Examiner*—David Bagnell
*Assistant Examiner*—Zakiya Walker
(74) *Attorney, Agent, or Firm*—Westman, Champlin & Kelly PA

(57) ABSTRACT

A bearing seal for earth boring bits is disclosed. A supporting ring is located in a groove formed in the earth boring bit. An annular cavity between the outer circumference of the supporting ring and the bottom of the groove is connected with the outside. An O-ring made of rubber is provided in an annular space defined by the sidewalls of the groove, the inner circumference of the supporting ring and the cylindrical surface of the bearing shaft of the head section to form a seal comprising a radial and axial seal. Compressive deformation of the O-ring does not depend on the eccentric rotation of the cone. Therefore, the working life of the seal is increased and the compressive deformation is decreased, thus facilitating use at high rotating speeds.

3 Claims, 4 Drawing Sheets

BEARING SEALING MEANS OF EARTH BORING BITS

Reference is hereby made to Chinese Application No. 98113483.1 filed Mar. 25, 1998.

BACKGROUND OF THE INVENTION

The invention relates to a bearing sealing means of earth boring bits used in well drilling, the petroleum industry, geologic surveys and the like.

Because of limited space in bearings of earth boring bits, an O-ring has been used as a radial seal for such bearings due to its simple structure and safe property. Such radial seals for bearings of earth boring bits are described in U.S. Pat. No. 3,397,928. In general, clearances of bearings in earth boring bits are greater (usually 0.08 to 0.23 mm) since the working temperature of such bits is higher. However, the greater clearance brings unfavorable effects when O-rings are used as radial seals. Significant compressive deformation is required to fit with the eccentric rotation of a loaded cone, however this causes increased heat generation due to the sliding friction of the O-ring. If the temperature becomes too great, the O-ring can be permanently deformed. For these reasons, an O-ring made of rubber cannot be used, otherwise its working life will be shortened when the bit is operated at high speed.

Attempts have been made to improve the sealing structures of bearing in earth boring bits, however none have been satisfactory. For example, a sealing assembly is disclosed in U.S. Pat. No. 4,623,028, which comprises a static and softer O-ring, a dynamic and harder O-ring and a rigid supporting ring. A smaller compressive deformation is designed for the dynamic O-ring, while a greater compressive deformation is designed for the static to compensate the eccentric rotation of the cone. Due to this structure, the sealing assembly can be used at high operating speed. Unfortunately, use of the assembly was limited because of its complex structure and large volume. A floating seal for earth boring bits is disclosed in U.S. Pat. No. 4,428,687. The seal comprises a groove formed on the bearing shaft of a head section. A split supporting ring is located in the groove. An O-ring is provided in an annular space defined by sidewalls of the groove, the outer circumference of the supporting ring, and the circumferential surface of the shaft so that a seal structure comprising radial and axial seals is formed. After forming the axial seal on the sidewall of the groove, there is air in the floating clearance between the inner circumference of the supporting ring and the bottom of the groove; and the floating clearance has been closed. During drilling, the pressure of drilling liquid is much greater than that of air located in the floating clearance. This causes the O-ring to be pressed partially into the groove, and thus deforms the supporting ring. This will cause the seal to no longer function. In practice the technical solution of the above patent is not satisfactory.

SUMMARY OF THE INVENTION

The object of the present invention is to provide a bearing seal for earth boring bits which can be used at high rotating speed. During drilling, the pressure in the floating cavity balances with that of drilling liquid. The bearing sealing means according to the invention is simple in structure and safe in property.

The object of the invention is attained to provide:

an annular groove at the entrance of a bearing hole, having a passage opened to the bottom of the annular cavity of the groove and connected with outside (for example, drilling liquid or grease lubricant filled in the bearing clearance);

a supporting ring located in the groove having an outer diameter being than the outer diameter of the groove;

an O-ring located in an annular space defined by the inner circumference of the supporting ring and the sidewalls of the groove.

After insertion of the bearing shaft into the bearing hole, the O-ring is squeezed in four directions so as to form a radial seal between the O-ring and the outer circumference of the bearing shaft and an axial seal between the O-ring and the sidewalls of the groove. Since the sliding frictional force produced between the O-ring and the sidewalls of the groove is significantly less than the radial compressive force acting on the O-ring. The O-ring and the supporting ring are completely coaxial with the bearing shaft even if the cone is eccentrically rotated. Thus, compressive deformation of the ring in the loaded direction of the bearing, and inadequate deformation in the non-loaded direction are avoided. The compression deformation of the O-ring can thereby be decreased by design so that it can be used at high rotating speeds. A passage connected with the outside is opened to the bottom of the groove so as to balance the pressure in the floating annular cavity with that of the outside and to maintain the safety of the seal. Drilling liquid filled into the floating annular cavity can cool the O-ring so that the bearing seal has a longer working life.

Compared to the prior bearing seals, the invention provides a number of advantages. First, because of the smaller compressive deformation and less heat produced by sliding friction, the O-ring can be used at a high rotating speeds. Second, the contact area between the O-ring and drilling liquid is larger so as to cool the O-ring effectively and to prolong its workinglife. Third, the bearing seal according to the invention is simple and compact in the structure and low in cost.

BRIEF DESCRIPTION OF THE DRAWINGS

The technical features of the present invention will be explained more detail below with reference to the drawings, in which:

FIG. 2 shows the first embodiment of the bearing sealing means in accordance with the invention;

FIG. 3 shows the first embodiment in accordance with the present invention, in which the working status of the sealing means of the invention at the loaded side of the bearing is shown when the cone is rotated eccentrically;

FIG. 4 shows the second embodiment in accordance with the invention;

FIG. 5 shows the second embodiment in accordance with the present invention, in which the working status of the sealing means of the invention at the loaded side of the bearing is shown when the cone is rotated eccentrically;

FIG. 6 shows the third embodiment in accordance with the invention;

FIG. 7 shows the third embodiment in accordance with the present invention, in which the working status of the sealing means of the invention at the loaded side of the bearing is shown when the cone rotated eccentrically.

DETAILED DESCRIPTION OF THE PREFERRED EMBODIMENTS

Figure 1:
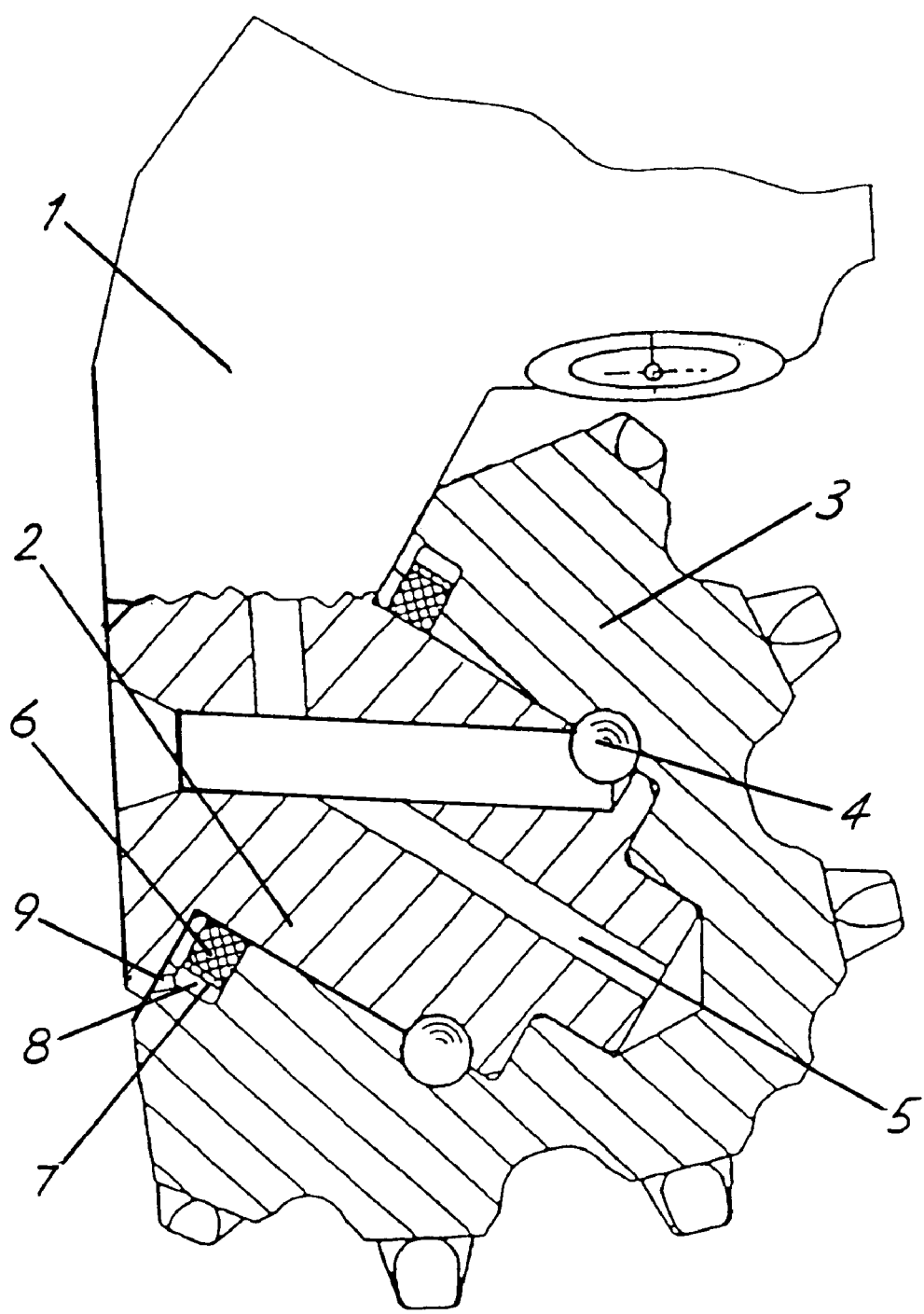
FIG. 1 is a partial sectional view of an earth boring bit provided with the bearing sealing means in accordance with the invention.

FIG. 1 is a partial sectional view of an earth boring bit provided with a bearing sealing means in accordance with the invention. Rotatable cone 3 for disintegrating rocks is mounted on bearing shaft 2 of head section 1. Cone 3 is retained on shaft 2 by steel balls 4 (only two shown). Grease lubricant is supplied to the bearing through a lubricant passage 5. In order to provide safe sealing for the bearings, to reliably seal the bearing to the drilling liquid, and to prevent the grease lubricant from leaking out the bearing, a supporting ring 7 and O-ring 6 made of rubber are located in an annular groove 8. Drilling liquid can enter into annular groove 8 through a passage 9 to cool O-ring 6 and to maintain the pressure in an annular cavity defined by the inner and the outer sidewalls of groove 8, the bottom of groove 8 and the outer circumferential surface of supporting ring 7 in conformity with the pressure outside of the annular cavity. Consequently, the sealing safety is increased and the working life of the sealing means is extended.

Figure 2:
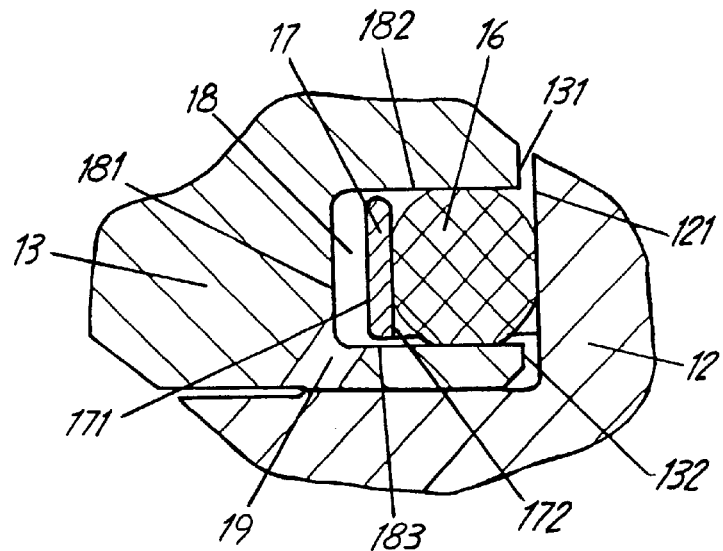
FIGS. 2 to 7 are enlarged sectional views of the bearing sealing means of an earth boring bit.
Figure 3:
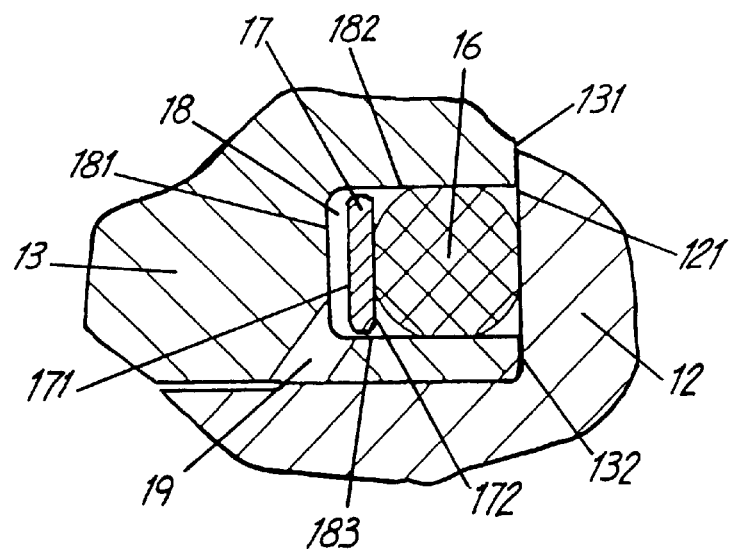

FIG. 2 shows the first embodiment of the sealing means in accordance with the invention. Supporting ring 17 is rectangular in transverse global change cross-section and is located in annular groove 8 formed at the entrance of the bearing hole. The radial distance between outer diameter 171 of supporting ring 17 and bottom 181 of groove 18 is greater than the bearing clearance. The radial thickness of supporting ring 7, made of elastic steel, such as spring steel, is very thin, for example 0.1 to 1.0 mm so that it can be put into annular groove 18 after being deformed. O-ring 16 is provided in an annular space defined by inner sidewall 182, outer sidewall 183 of the groove, and inner circumferential surface 172. Once O-ring 16 is located in the annular space, shaft 12 is inserted in bearing hole 131. As a result, O-ring 16 is squeezed in the radial and axial directions so that radial and axial seals are provided between the O-ring and the circumferential surface of shaft 12, and between O-ring 16 and inner sidewall 182, respectively. Since the sliding friction forces between O-ring 16 and sidewalls 182, 183 are by much less than the radial compressive force acting on O-ring 16, O-ring 16 will slide on sidewalls 182, 183 and remain essentially coaxial with shaft 12 when cone 13 is eccentrically rotated with respect to shaft 12 as shown in FIG. 3. During drilling, drilling liquid can enter into the annular cavity through passage 19 so that O-ring 16 is cooled by drilling liquid and the pressure in the annular cavity balances the pressure of drilling liquid.

Figure 4:
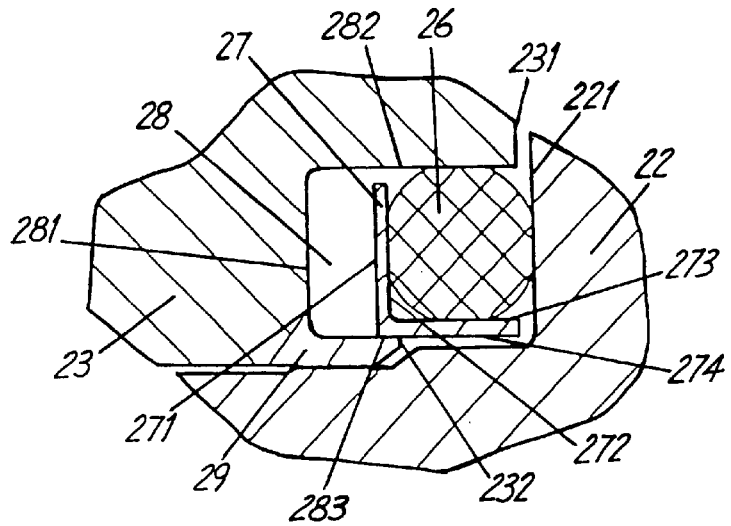
Figure 5:
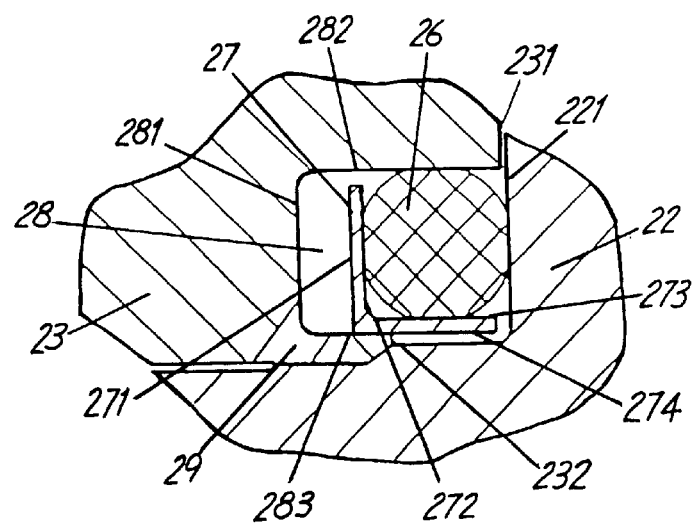

The second sealing means according to the invention is shown in FIG. 4. Annular groove 28 is also provided in the bearing hole. Diameter 232 of the entrance of the bearing hole is greater than the diameter 231 of the bearing hole. A supporting ring 27, having an L-shape in transverse cross-section, is provided in annular groove 28. The outer diameter 271 of supporting ring 27 is greater than diameter 232 of the entrance of the bearing hole and the difference between the two is greater than the clearance of the bearings. The outer diameter 271 of supporting ring 27 is less than the outer diameter 281 of annular groove 28 and the difference between both of them is at least π times as many as the difference between the outer diameter 271 of supporting ring 27 and diameter 232 of the entrance of the bearing hole. As a result, when supporting ring 27 is pressed and becomes an elliptical ring whose minor axis is shorter than diameter 232 of the entrance of bearing hole 10, an end of the ellipse at its long axis side can smoothly pass through diameter 232 of the entrance of the bearing hole while another end of the ellipse can be put into groove 28. Supporting ring 27 is made of spring steel or the like so that it can relax to a circle after mounted into groove 28. O-ring 26 is provided in an annular space having a rectangular in transverse cross-section defined by inner sidewall 282 of groove 28, inner circumference 272 and inner bottom 273 of supporting ring 27. Once O-ring 26 is so positioned, bearing shaft 22 is inserted into bearing hole 231. O-ring 26 is squeezed in the radial and axial directions so that radial and axial seals are provided between the O-ring and the circumferential surface 221 of shaft 22, and between O-ring 26 and inner sidewall 282 of bearing groove 28, respectively. Since the sliding friction forces between O-ring 26 and inner sidewall 282 of groove 28, and between outer bottom 274 of supporting ring 27 and outer sidewall 238 of groove 28 is much less than the radial compressive force acting on O-ring 26, as shown in FIG. 5, O-ring 26 and supporting ring 27 will slide together on sidewalls 282, 283 of groove 28 and remain essentially coaxial with shaft 22 when cone 23 is eccentrically rotated with respect to shaft 22. During drilling, drilling liquid can enter into the annular cavity of groove 28 through a clearance between outer bottom 274 of supporting ring 27 and outer sidewall 283 of groove 28 to balance the pressure in the annular cavity of groove 28 with that of the drilling liquid.

Figure 6:
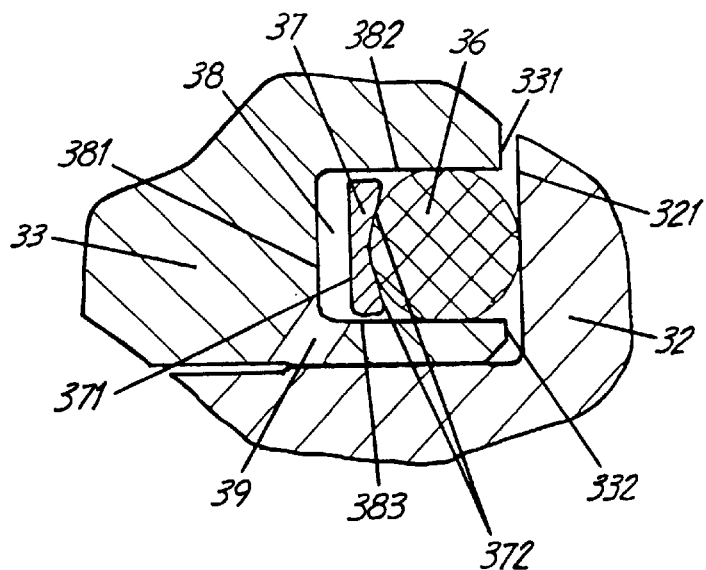
Figure 7:
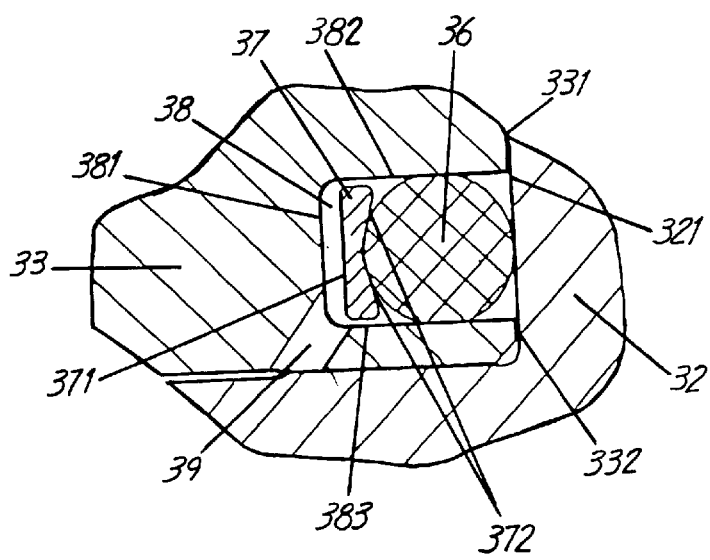

The third embodiment of the sealing means according to the invention is shown in FIG. 6. Annular groove 38 is provided in the bearing hole. Supporting ring 37 has a V-shaped transverse cross-section and the vertex angle of the V-shape is in a range from 90° to 160°. Supporting ring 37 is provided in the groove 38. The radial distance between outer diameter 371 of supporting ring 37 and the bottom of groove 38 is larger than the clearance of the bearing. Supporting ring 37 is made of super-elastic alloy, such as Ti—Ni alloy, so that it can be put into groove 38 after being deformed. O-ring 36 is provided in an annular space defined by inner and outer sidewalls 382, 383 of groove 38, and V-shaped inner surface 372 of supporting ring 37. Once O-ring 36 is disposed in the annular space, shaft 32 is inserted into bearing hole 331. Consequently, O-ring 36 will be squeezed in the radial and the axial directions to form radial and axial seals respectively, between O-ring 36 and the outer circumferential surface 321 of shaft 32 and between O-ring 36 and inner sidewall 382 of groove 38. Since the sliding friction forces between O-ring 36 and sidewalls 382, 383 of groove 38 are much less than the radial compressive force acting on O-ring 36, as shown in FIG. 7, O-ring 36 will slide on sidewalls 382 and 383 and remain essentially coaxial with shaft 32 when cone 33 is eccentrically rotated with respect to shaft 32. During drilling, drilling liquid can enter into groove 38 through passage 39 so that O-ring 36 is cooled and the pressure in the annular cavity of groove 38 is balanced with that of the of drilling liquid.

What is claimed is:

1. A bearing seal for earth boring bits, the bearing seal comprising:

an annular groove;

a supporting ring provided in the annular groove;

a radial distance between an outer diameter of the supporting ring and a bottom of the groove is longer than a clearance of the bearing;

an O-ring provided in an annular space defined by sidewalls of the groove, the inner circumference of the supporting ring and an outer circumferential surface of the a bearing shaft;

an axial seal formed between the O-ring and an sidewall of the groove;

a radial seal formed between the O-ring and the circumferential outer surface of the bearing shaft; and a passage coupling an annular cavity defined by the outer diameter of the supporting ring and the bottom of the annular groove with outside.

2. The bearing seal according to claim 1, wherein the supporting ring is rectangular in transverse cross-section and constructed from an elastic alloy, the supporting ring having a radial thickness between about 0.1–1.0 mm, wherein the passage connects the annular cavity with drilling liquid.

3. The bearing seal according to claim 1, wherein the supporting ring is rectangular in transverse cross-section and constructed of an elastic alloy, the supporting ring having a radial thickness between about 0.1–1.0 mm, wherein the passage connects the annular cavity with grease lubricant.

* * * * *

UNITED STATES PATENT AND TRADEMARK OFFICE
CERTIFICATE OF CORRECTION

PATENT NO. : 6,176,331 B1
DATED : January 23, 2001
INVENTOR(S) : Zhi Xun Jin et al.

It is certified that error appears in the above-identified patent and that said Letters Patent is hereby corrected as shown below:

Column 1,
Line 28, replace "bearing" with -- bearings --.

Column 3,
Line 22, delete "global change".

Column 4,
Line 52 through Column 6, line 6, replace claims 1-3 with the following:
1. An apparatus for sealing a bearing for earth boring bits, the bearing adapted to have a clearance with a shaft, the apparatus comprising:
    an annular groove;
    a supporting ring provided in the annular groove;
    a radial distance between an outer diameter of the supporting ring and a bottom of the groove is longer than the clearance of the bearing;
  an O-ring provided in an annular space defined by sidewalls of the groove, the inner circumference of the supporting ring and an outer circumferential surface of the shaft;
  an axial seal formed between the O-ring and a sidewall of the groove;
  a radial seal formed between the O-ring and the circumferential outer surface of the bearing shaft; and
  a passage coupling an annular cavity defined by the outer diameter of the supporting ring and the bottom of the annular groove with outside.

UNITED STATES PATENT AND TRADEMARK OFFICE
CERTIFICATE OF CORRECTION

PATENT NO. : 6,176,331 B1
DATED : January 23, 2001
INVENTOR(S) : Zhi Xun Jin et al.

It is certified that error appears in the above-identified patent and that said Letters Patent is hereby corrected as shown below:

2. The apparatus according to claim 1, wherein the supporting ring is rectangular in transverse cross-section and constructed from an elastic alloy, the supporting ring having a radial thickness between about 0.1 - 1.0 mm, wherein the passage connects the annular cavity with drilling liquid.

3. The apparatus according to claim 1, wherein the supporting ring is rectangular in transverse cross-section and constructed of an elastic alloy, the supporting ring having a radial thickness between about 0.1 - 1.0 mm, wherein the passage connects the annular cavity with grease lubricant.

Signed and Sealed this

Thirtieth Day of April, 2002

*Attest:*

JAMES E. ROGAN
*Attesting Officer*  *Director of the United States Patent and Trademark Office*